Nov. 17, 1959 — C. P. CARLIN — 2,912,784
FISH LURE
Filed Jan. 30, 1959
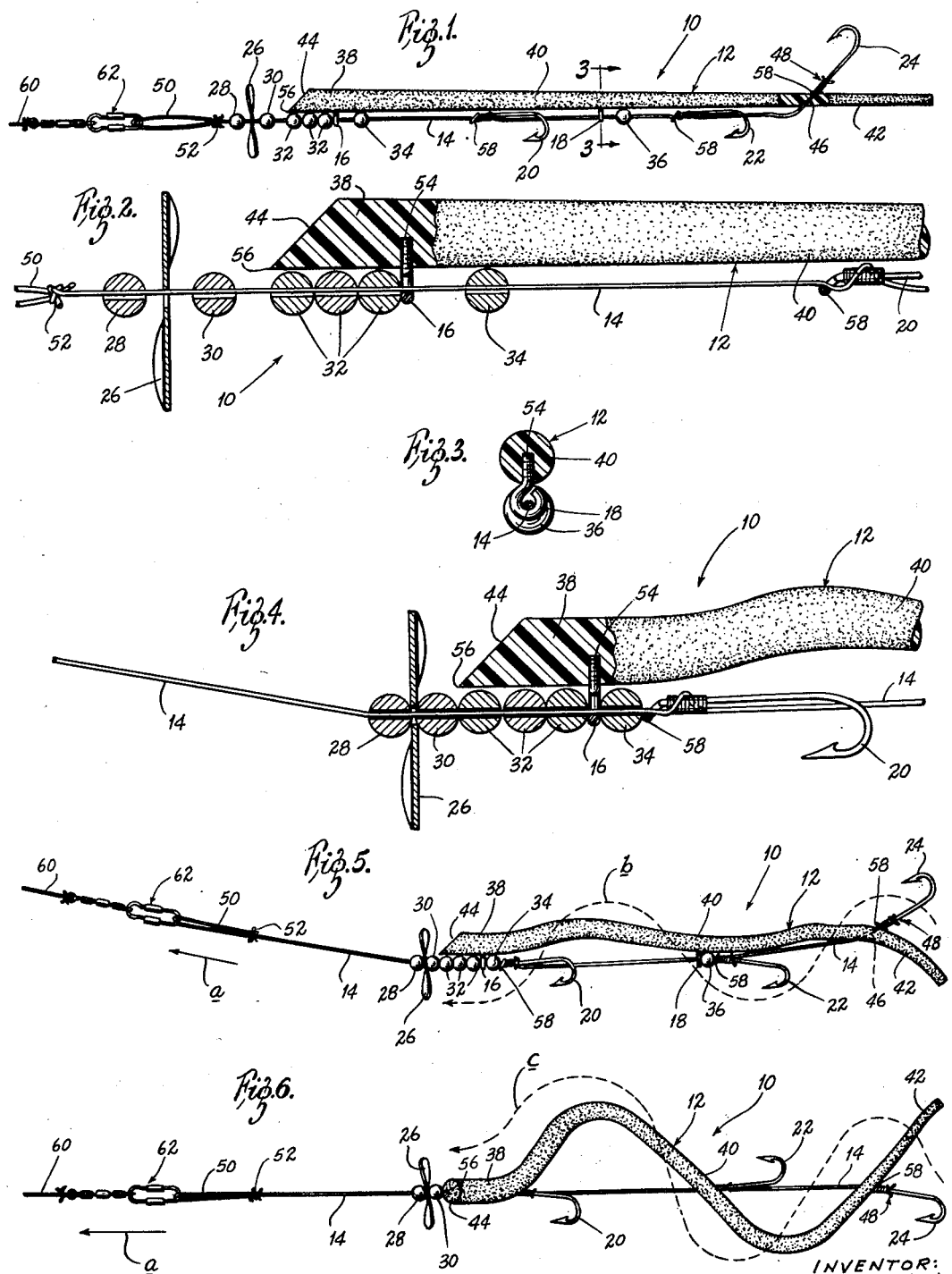
INVENTOR:
CHARLES P. CARLIN,
BY George Mager
HIS ATTORNEY

United States Patent Office 2,912,784
Patented Nov. 17, 1959

2,912,784

FISH LURE

Charles P. Carlin, St. Louis, Mo.

Application January 30, 1959, Serial No. 790,122

7 Claims. (Cl. 43—42.17)

Generally the present invention relates to the sport of catching fish, particularly game fish such as bass, pike, trout, and the like.

More particularly, this invention relates to artificial lures for use in said sport, and is directed to the provision of a lure that is simulative of an earthworm, and that incorporates novel means for automatically causing the lure to revolve as it progresses through the water responsive to the retrieval thereof after it has been cast.

It is well known and recognized by experienced fishermen that worm type lures are particularly effective in attracting game fish. However insofar as I am aware, lures of this type heretofore progress through the water in a straight path, it being requisite to jiggle the line during the retrieval operation in order to impart motion over and above the normal to the lures.

The primary object of the present invention is to provide a worm lure that revolves automatically as it is being retrieved.

It is a further object of this invention to provide a worm lure that revolves automatically in an irregular spiral fashion as it is being retrieved.

Briefly, the invention is comprised of an elongated cylindrical body having the appearance of an earthworm, a pair of eye elements rigid with said body, a draw cord having at least three fish hooks secured thereto, a spinner of fan-like contour and a plurality of perforated beads loosely strung on the draw cord, and a loop integrally formed on one end of the draw cord to facilitate attachment of the lure to a swivel device on the end of a fishing line.

The elongated worm body tapers gradually from end to end thereof, and is comprised of resilient plastic material, that is preferably, though not at all necessarily, red in color. The eye elements have their shanks embedded in the worm body, and are located in determined spaced relationship relatively to one another. The end segment of the draw cord remote from the loop extends diagonally through the worm body, and is secured to the eye of a fish hook that serves to anchor it.

That portion of the draw cord intermediate the loop and the anchored ends thereof is slidably supported in the spaced eye elements, and two fish hooks in determined spaced relationship are secured thereto. The spinner and the beads mentioned above are slidably and rotatably mounted on this intermediate portion of the cord in a definite pattern of succession, as will appear.

With one end of the draw cord anchored in a portion of the worm body, and the loop on the other end of the cord attached to a fishing line by means of a swivel device, the cord is drawn taut when the lure is retrieved, in consequence whereof the resilient worm body is distorted into a generally irregular convolute configuration that causes it to revolve continually, as will also appear. Some of the beads function in the capacity of bearings, whereby the revolving action is facilitated.

Novel features and advantages inherent in the invention will be apparent or pointed out hereinafter. The preferred embodiment of the lure is illustrated on a sheet of drawings that accompanies this specification, and a more comprehensive understanding of the details of the invention may be had from the description that follows with reference to said drawings, wherein:

Figure 1 is a side elevational view of a fish lure incorporating the concepts of the present invention, the elements included in the lure being shown in an exemplary normal disposition;

Figure 2 is a fragmentary view on an enlarged scale and partly in section of the forward or leading end portion of the lure, and the elements therewith associated;

Figure 3 is an enlarged sectional view taken on the line 3—3 of Figure 1;

Figure 4 is a view similar to Figure 2, illustrating the position that the included elements assume when the lure is in use;

Figure 5 is a pictorial representation of the lure as it would appear when travelling through the water; and Figure 6 is a pictorial representation similar to Figure 5, the lure being viewed however from another angle.

With particular reference to Figures 5 and 6, it will be understood that these views are exemplary, and are presented to demonstrate only some of the irregularly spiral and undulatory movements of the lure that take place as it is being propelled forwardly.

The novel lure comprising the present invention is designated as a whole by the numeral 10. It includes: an elongated body 12 of resilient material, preferably plastic and circular in cross-section; a draw cord 14; a forward eye element 16 and a rearward eye element 18, the intermediate or main portion of said draw cord being slidably supported in said eye elements; a plurality of fish hooks rigidly secured at determined intervals to the draw cord, said hooks including a forward hook designated 20, an intermediate hook 22, and a rearward hook designated 24; a spinner in the form of a centrally apertured fan blade 26 loosely mounted on the draw cord; and a plurality of similar perforated beads slidably and rotatably mounted on portions of the draw cord, there being a bead 28 in advance of the fan blade spinner 26, a bead 30 rearwardly of said spinner, three beads 32 between the bead 30 and forward eye element 16, a bead 34 between the eye element 16 and the hook 20, and a bead 36 between the eye element 18 and the hook 22, as shown.

The body 12 is so contoured as to simulate an earthworm, and preferably is solid and molded of resilient plastic material. The forward, or what may also be termed the leading end portion of the body 12 is designated 38, the intermediate portion is designated 40, and the rearward, or what may also be termed the trailing end portion thereof is designated 42.

As best seen in Figure 1, the diameter of the body 12 decreases gradually from the leading to the trailing end portion thereof, and the extremity of the leading end portion 38 is beveled as at 44, for a purpose to appear.

As clearly illustrated in the drawings, the draw cord 14 extends freely through the beads, the spinner, and the eye elements, but the rear terminal end segment thereof is anchored to the trailing end portion 42 of the body 12. Thus as illustrated in Figure 1, the terminal end segment of said cord extends diametrically angularly through the portion 42 of the body 12 as indicated at 46, and is knotted or otherwise secured to the eye and adjacent shank portion of the hook 24 as indicated at 48. At its forward end, the cord 14 is provided with a loop portion 50 defined by a knot 52, said knot serving to maintain the lure assembly intact when not in use. Thus when the lure is not in use, the draw cord would lie in substantial parallelism with the resilient body 12, as shown.

As seen to best advantage in Figures 2 and 3, the eye elements 16 and 18 are provided with threaded shanks 54 that are molded into the lure body 12, whereby fortuitous displacement of them is obviated. The location of said eye elements is important, the forward element 16 being disposed in the leading end portion 38 rearwardly of the body tip 56 a distance at least approximately equal to the diameter total of the beads 32, whereas the rearward element 18 is disposed in the intermediate portion 40 at least approximately centrally of the lure body.

The hooks 20, 22, and 24 are of conventional type and are not deemed to require detailed description. Preferably, but not necessarily, the hooks 20, 22, and 24 are provided with the familiar turned down eye formations 58, and are rigidly secured to the draw cord in such fashion that the barbs thereof are clear of the body 12, as shown.

The location of the hooks 20 and 22 relatively to the eye elements 16 and 18, with the cord 14 substantially taut but not under tension as shown in Figure 1, is of prime importance. Thus with particular reference to this figure, it is noted that the distance between the element 16 and the eye 58 of the hook 20 is at least approximately equal to twice the distance between the element 18 and eye 58 of the hook 22.

Numeral 60 indicates a fishing line leading from a casting reel or rod, and having a swivel snap device 62 secured to the illustrated free end thereof. This type of device is well known, and per se forms no part of the present invention. It is of critical importance however, that the connector between the loop 50 and the fishing line be of the swivel type, inasmuch as the draw cord 14 revolves with the lure body 12. Consequently line twisting would develop without such a swivel connection, as should be manifest.

Use

Although it is believed that the foregoing description augmented by the drawings affords a comprehensive understanding of the invention, a brief further explanation will be given. Thus, it will be assumed that a fisherman has completed his cast, and that the lure 10 has struck the water and become submerged therein, and that the fisherman then begins retrieving said lure. As the line 60 is pulled in the direction indicated by the arrows *a* in Figures 5 and 6 (that is toward the fisherman), the spinner blade 26 is caused to revolve and simultaneously to move rearwardly, together with the beads 28, 30, and 32. This action continues until all of these elements are in contiguous alignment relatively to one another on the cord 14, with the rearmost bead 32 in contact with the eye element 16, as shown particularly in Figure 4.

Attention is directed to the beads 28 and 30. This pair of beads constitutes a composite rotary bearing for the spinner blade 26, and serves to maintain said blade at least approximately normal to the axis of the draw cord 14, so that the rearward thrust of the rotating blade resists the forward movement of the body 12, whereas the cord 14 advances readily as the tension on the fishing line 60 increases.

Consequently, when the bead 36 reaches the eye element 18 responsive to the forward movement of the hook 22 that is affixed to the draw cord, the rearward segment of the intermediate portion 40 together with the trailing end portion 42 of the body 12 will have been automatically deformed into one or more irregular convolute contours. At the same time, the hook 20 will have advanced an equal distance toward the eye element 16, so that it would then be disposed approximately midway between the eye elements 16 and 18.

Instantaneously thereupon however, the bead 34 would be brought into contact with the eye element 16 by means of the hook 20 that is likewise affixed to the draw cord 14, wherefore the forward segment of the intermediate portion 40 together with the rearward segment of the leading end portion 38 of the lure body 12 will also have been automatically deformed into one or more irregular convolute contours.

It will of course be understood that the described sequence with respect to the behavior of the elements included in the lure 10 is initiated and completed almost instantaneously following the cast, so that as said lure is being retrieved, it moves through the water in a succession of spiral, helical, and sinusoidal paths, some of which are suggested by the exemplary broken line arrows *b* and *c* appearing respectively in Figures 5 and 6.

From an inspection of these views, it should be apparent that the non-symmetrical gyrations of the worm body 12 as it revolves with and about the axis of the draw cord 14, presents a constantly changing aspect of the lure that is adapted to quickly attract the attention of game fish, as will be vouched for by fishermen.

Reverting to Figure 4 and the bead 30, it will be observed that this bead being lodged against the foremost of the beads 32, serves also to maintain the spinner fan blade 26 from coming in contact with the tip 56 of the leading end portion 38 of the lure body 12. It will further be noted that the rearmost bead 32 and the bead 34 combine to provide a rotary bearing for the eye element 16 as it revolves with the worm body about the draw cord. Similarly, the bead 36 provides a rotary bearing between the eye element 18 and the hook 22, as shown in Figure 5. With these arrangements, it should be manifest that the spirally revolving movements of the worm body 12 are at no time inhibited, but that instead, they are facilitated.

With respect to the obtusely angular face 44 that defines the extremity of the worm body leading end portion 38, applicant has found in consequence of numerous tests that the greater area of resistance to water pressure thus provided rearwardly of the spinner fan blade 26 tends to create more turbulence about the trailing end portion 42 of the worm body, and the hook 24 anchored thereto. It should be understood however, that the provision of the angular surface 44 is not critical, inasmuch as the lure concept of the present invention may achieve its objectives even though the leading end portion 38 thereof were defined by a surface perpendicular to the axis of the worm body 12.

From the foregoing, it is believed that the present invention provides a lure that is not only novel, but that is also adapted to attain its objectives without the requirement of skill on the part of the user. Obviously, the lure of the present invention may also be employed in trolling and analogous fishing ventures without departure from the characteristic concept thereof.

Wherefore it will be understood that the instant invention is not to be limited to the precise details of construction illustrated and described, but contemplates any and all modifications thereof that may fall within the scope of the claims hereunto appended.

What I claim is:

1. In a fish lure including means adapted for the releasable attachment thereof to a swivel snap device on the free end of a fishing line: a normally straight elongated cylindrical body of resilient material simulating an earthworm, said body having a leading, an intermediate, and a trailing end portion with the diameter thereof decreasing gradually from said leading to said trailing end portion; and means adapted to automatically transform said straight body into an irregularly convolute body responsive to a retrieval operation effected by reeling in the fishing line, said means including a cord, spaced first and second eye elements rigid with said elongated body, and said cord being slidably supported in said first and second eye elements and having one of its ends extending diametrically through and anchored to the trailing end portion of said body, a pair of fish hooks secured to the cord in determined spaced relationship relatively to one another and to said eye elements, a spinner of fan-like contour loosely supported on the cord forwardly of the leading end portion aforesaid of the elongated body, a plurality of perforated beads loosely supported on the cord between the spinner and the first of said eye elements, a single bead loosely supported on the cord between the first of said eye elements and one of said pair of hooks, and a single bead loosely supported on the cord between the second of said eye elements and the other of said pair of hooks.

2. A fish lure adapted to simulate a revolving earthworm as the lure is being retrieved, said lure comprising an organization of elements including: a solid elongated body member of resilient plastic material of circular cross-section including a leading end portion, an intermediate portion, and a trailing end portion, the diameter of said body member decreasing gradually from the leading to the trailing end portion thereof; a first eye member rigid with said leading end portion; a second eye member rigid with said intermediate portion; a draw cord extending freely through said eye members in substantial parallelism with said body member, one end of said cord being anchored to the trailing end portion aforesaid of the body member; a loop provided on the opposite end of the draw cord adapted to facilitate the attachment of the lure to a swivel device on the free end of a fishing line; a first turned down eye type fish hook affixed to the cord at a determined position intermediate the first and second eye elements; a second turned down eye type fish hook affixed to the cord at a determined position intermediate the second eye member and the anchored end of said cord; a spinner member of fan-like configuration supported for free rotational and longitudinal movements on the cord between the loop thereof and said leading end portion of the resilient body member; a first perforated bead strung on the cord between said spinner member and a knot defining the loop aforesaid; a second perforated bead strung on the cord between said spinner member and the leading end portion aforesaid of said body member; a plurality of perforated beads strung on said cord between the second perforated bead aforesaid and the first eye member; a perforated bead strung on the cord between said first eye member and said first fish hook; and a perforated bead strung on the cord between said second eye member and the second fish hook aforesaid.

3. A fish lure adapted to simulate a revolving earthworm as the lure is being retrieved, said lure comprising the organization of elements set forth in claim 2 wherein the means for anchoring one end of said cord comprises a turned down eye type fish hook projecting angularly from the trailing end portion of said resilient body member.

4. A fish lure adapted to simulate a revolving earthworm as the lure is being retrieved, said lure comprising the organization of elements set forth in claim 2 wherein the extremity of the leading end portion of the resilient body member is defined by an obtusely angular face.

5. A fish lure adapted to simulate a revolving earthworm as the lure is being retrieved, said lure comprising the organization of elements set forth in claim 2 wherein the normal distance between said first eye member and the turned down eye of the first fish hook is at least approximately equal to twice the distance between the second eye member and the turned down eye of the second fish hook.

6. In a fish lure, the combination of: an elongated tapered cylindrical body of solid resilient material simulative of an earthworm including a leading end portion and a trailing end portion and an intermediate portion joining said leading end and trailing end portions; a draw cord anchored at one end in the trailing end portion of said body; a loop formed on the opposite end of the draw cord adapted to releasably attach the lure to a swivel device on the free end of a fishing line; spaced means rigid with the leading end and intermediate portions of said body for slidably supporting the draw cord; and means supported on the draw cord including a pair of spaced fish hooks rigidly secured thereto adapted to change said body into an irregularly convolute configuration responsive to retrieving said lure via said fishing line, in consequence whereof said body is caused to revolve in irregularly spiral fashion with and about said cord as the lure advances through the water.

7. In a fish lure, the combination of: an elongated tapered cylindrical body of solid resilient material simulative of an earthworm including a leading end portion and a trailing end portion and an intermediate portion joining said leading end and trailing end portions; a draw cord anchored at one end by means of a fish hook in the trailing end portion of said body; a loop formed on the opposite end of the draw cord adapted to releasably attach the lure to a swivel device on the free end of a fishing line; spaced eye elements rigid with the leading and intermediate portions of said body for slidably supporting the draw cord; and means supported on the draw cord including a pair of spaced fish hooks rigidly secured thereto adapted to change said body into an irregularly convolute configuration responsive to retrieving said lure via said fishing line, in consequence whereof said body is caused to revolve in irregularly spiral fashion with and about said cord as the lure advances through the water.

References Cited in the file of this patent

UNITED STATES PATENTS

| | | |
|---|---|---|
| 1,427,147 | Barsch | Aug. 29, 1922 |
| 2,290,433 | Jeffers | July 21, 1942 |
| 2,724,205 | Howard | Nov. 22, 1955 |
| 2,770,063 | Martin | Nov. 13, 1956 |
| 2,791,859 | Wentworth | May 14, 1957 |

FOREIGN PATENTS

| | | |
|---|---|---|
| 3,631 | Great Britain | 1905 |